US006438456B1

(12) United States Patent
Feddema et al.

(10) Patent No.: US 6,438,456 B1
(45) Date of Patent: Aug. 20, 2002

(54) PORTABLE CONTROL DEVICE FOR NETWORKED MOBILE ROBOTS

(75) Inventors: John T. Feddema; Raymond H. Byrne, both of Albuquerque; Jon R. Bryan, Edgewood; John J. Harrington; T. Scott Gladwell, both of Albuquerque, all of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/841,808

(22) Filed: Apr. 24, 2001

(51) Int. Cl.$^7$ ................................................ G06F 19/00

(52) U.S. Cl. ................. 700/245; 700/247; 700/248; 700/249; 700/253; 701/24; 701/28; 701/301; 318/568.12

(58) Field of Search ............................. 700/245, 248, 700/247, 249, 257, 253; 701/301, 27, 98, 214, 28, 300, 50, 24; 318/568.12; 340/436, 903; 342/455; 348/120

(56) References Cited

U.S. PATENT DOCUMENTS

| | | | | |
|---|---|---|---|---|
| 5,307,271 A | * | 4/1994 | Everett et al. | 264/297.2 |
| 5,367,456 A | * | 11/1994 | Summerville et al. | 370/259 |
| 5,438,771 A | * | 8/1995 | Sahm et al. | 703/23 |
| 5,606,444 A | * | 2/1997 | Johnson et al. | 711/112 |
| 5,974,348 A | * | 10/1999 | Rocks | 706/10 |
| 6,275,773 B1 | * | 8/2001 | Lemelson et al. | 382/209 |
| 2002/0022927 A1 | * | 2/2002 | Lemelson et al. | 701/301 |

OTHER PUBLICATIONS

Wang et al., A wireless media access protocol (CSMA/CD–W) for mobile robot based distributed robotic system, 1995, IEEE, p 2561–2566.*

Yakoh et al., MACS: An efficient multicast mechanism for radio packet communication among multiple mobile robots, 1993, IEEE, pp. 561–564.*

Byrne, et al., "Cooperating Mobile Robots," pending patent application filed Apr. 24, 2001.

Byrne, et al., "Cooperative System and Method Using Mobile Robots for Testing a Cooperative Search Controller," pending patent application filed Apr. 24, 2001.

Feddema, et al. "Networked Mobile Robots Control Kit," pending patent application filed Apr. 24, 2001.

LEGO® product information, LEGO MindStorms™ Robotics Invention System, 3 pages retrieved from the Internet on Apr. 16, 2001, at http://mindstorms.lego.com/products/3D_Simulator/index.html and http://mindstorms.lego.com/products/dsdk/specs.html.

K–Team, "Koala family" features, modules and specifications, 3 pages retrieved from the Internet on Apr. 16, 2001, at http://www.k–team.com/robots/koala/index.html.

iRobot, "Swarm: Distributed programming of autonomous robots," Apr. 16, 2001, 2 pages retrieved from the Internet, at http:///www.irobot.com/rd/research_swarm.asp.

Lynxmotion, "Carpet Rover II Explorer Robot Kit," 2 pages retrieved from the Internet on Apr. 16, 2001, at http://www.lynxmotion.com/cr2e.htm.

(List continued on next page.)

*Primary Examiner*—Yonel Beaulieu
*Assistant Examiner*—McDieunel Marc
(74) *Attorney, Agent, or Firm*—Suzanne L. K. Rountree (57) ABSTRACT

A handheld control device provides a way for controlling one or multiple mobile robotic vehicles by incorporating a handheld computer with a radio board. The device and software use a personal data organizer as the handheld computer with an additional microprocessor and communication device on a radio board for use in controlling one robot or multiple networked robots.

22 Claims, 4 Drawing Sheets

OTHER PUBLICATIONS

Carnegie Mellon, "Palm Pilot Robot Kit"0 and "PPRK: Overview," 3 pages retrieved from the Internet on Apr. 19, 2001, at http://www.acroname.com/robotics/info/PPRK/PPRK.html and http://www.acroname.com/robotics/info/PPRK/overview.html.

Hoyt, "A Radio–Controlled Car and a 68HC11 Microproccessr," Circuit Cellular INK®, issue #78, pp. 20–25, Jan. 1997.

Lewis et al., "Cooperative Control of a Squad of Mobile Vehicles," IASTED International Conference on Control and Applications, Honolulu, HI, Aug. 12–14, 1998.

Hurtado et al., "Distributed Sensing and Cooperative Control for Swarms of Robotic Vehicles," Proceedings of IASTED International Conference on Control and Applications, pp. 175–178, Honolulu, HI, Aug. 12–14, 1998.

* cited by examiner-

PORTABLE CONTROL DEVICE FOR NETWORKED MOBILE ROBOTS

RELATED PATENT APPLICATIONS

Co-pending, related applications include Feddema et al. "Networked Mobile Robots Control Kit," U.S. patent application Ser. No. 09/841806 filed on Apr. 24, 2001; Byrne et al., "Cooperating Mobile Robots," U.S. patent application Ser. No. 09/841807 filed on Apr. 24, 2001; and Byrne et al, "Cooperative System and Method using Mobile Robots for Testing a Cooperative Search Controller," U.S. patent application Ser. No. 09/841846 filed on Apr. 24, 2001; all assigned to Sandia National Laboratories.

This invention was made with Government support under Contract DE-AC04-94AL85000 awarded by the U.S. Department of Energy. The Government has certain rights in the invention.

BACKGROUND OF THE INVENTION

This invention relates to the field of mobile robots and more particularly to portable control devices with communication and control electronics for networked mobile platforms.

Due to potentially prohibitive costs of robots with their associated sensors and electronics, it is desirable to produce lower cost robots for use in quantity. Interest in the use of multiple robots is growing due to recent technical and cost advances in microelectronics and sensors. These advances include small, low power CCD cameras; small microprocessors with expanded capabilities; autonomous navigation systems using global positioning systems; and several types of small sensors.

The use of multiple robots is particularly applicable in reconnaissance, surveillance and target acquisition, force protection and physical security, locating and identifying hazardous targets, and in other applications which potentially remove humans from tedious or potentially hazardous activities. The coordination of multiple autonomous robots can be effective and efficient in the above applications through information sharing and the formation of distributed communication networks. Multiple robots controlled to cooperatively achieve an objective have the potential to be more effective than a collection of independent robots.

Two example applications are disbursing autonomous robotic vehicles throughout an area (for example, through corridors in a building) using networked communications in surveillance activities, or in locating and tracking an intruder such as an evader or trespasser. Another example is in chemical applications where autonomous robotic vehicles can be used to locate a source, including, for example: chemical, temperature, explosive, radiation, and light sources, which can be time dependent, or can take the form of a plume formed from steam, humidity, or other measurable characteristic. Each robotic vehicle with on-board sensors needs to be inexpensive in order to utilize multiple robots in quantity in cooperating applications.

Mobile Robots

Different mobile robot platforms exist, spanning a wide range of costs and capabilities, from robots with electronic packages for specialized operations to inexpensive remote control cars and robots for educational applications. Remote control toys generally are operated as single units, communicating with a base control device, and do not use controllers capable of controlling and communicating among large numbers of robots. One example is LEGO MindStorms™ Robotics Invention System. See LEGO® product information, LEGO MindStorms™ Robotics Invention System, April 2001, retrieved from the Internet.

Remote control toy cars such as those manufactured by toymakers are inexpensive (for example, in the ballpark range of $30 to $100) remotely driven vehicles with radio controlled joysticks, but they are not designed for autonomous navigation and cannot communicate and geolocate with respect to each other. Examples are those remote control cars manufactured by Tyco of Mattel, Inc. and other remote control toy car manufacturers.

At the other extreme are expensive robotic vehicles (for example, costing several thousand dollars). For example, robotic vehicles available from Real World Incorporated (RWI) are capable of remote control via a joystick and also capable of being programmed to perform autonomous navigation. The Koala robot available from K-Team is a six-wheeled mid-sized robot capable of communication, sensing, and all-terrain operation. These are highly capable robotic vehicles but can be cost prohibitive in applications requiring numerous autonomous vehicles. K-Team does not disclose a conversion kit for converting a remote control car to an autonomous robotic vehicle and does not disclose a handheld control device utilizing commercially available personal computing devices. See K-Team, "Koala family" features, modules and specifications, April 2001, retrieved from the Internet.

iRobot's swarm "robots in a glass box" utilize a multi-robot operating system and communicate with their neighbors using infrared light. iRobot does not disclose a hybrid mobile platform from conversion of a radio-controlled car to a mobile robot and does not disclose a handheld control device utilizing inexpensive and commercially available personal computing devices. See, iRobot, "Swarm: Distributed programming of autonomous robots," April 2001, retrieved from the Internet.

Lynxmotion's Carpet Rover II Explorer educational robot has proximity and tracking sensors and a programmable microcontroller but does not have a transceiver suitable for communicating with other robots in a swarm or with a base station. Lynxmotion does not disclose a conversion kit for converting a remote control car to an autonomous robotic vehicle and does not disclose a handheld control device utilizing a commercially available personal computing device. See Lynxmotion, "Carpet Rover II Explorer Robot Kit," April 2001, retrieved from the Internet.

Carnegie Mellon's Palm Pilot Robot uses a commercially available personal data organizer to control the robot. Carnegie Mellon discloses a robot with three wheels in a triangular orientation, allowing holonomic motion control, with control executing on a Palm Device. Carnegie Mellon does not disclose a conversion kit for converting a remote control car to an autonomous robotic vehicle and does not disclose a remotely used handheld control device utilizing a commercially available personal computing device. See Carnegie Mellon, "Palm Pilot Robot Kit" and "PPRK: Overview," April 2001, retrieved from the Internet. Hoyt, "A Radio-Controlled Car and a 68HC11 Microproccessor," Circuit Cellular INK®, issue #78, pp. 20–25, January 1997, discloses the addition of a microprocessor to a radio-controlled car. Hoyt teaches a single car capable of recording and then retracing its path. Hoyt does not teach conversion of a radio-controlled car to a mobile robot capable of communicating and cooperating with other radio-controlled cars or autonomous robotic vehicles.

Lewis et al. discloses the use of a squad of all terrain RATLER™ (roving all terrain lunar explorer rovers) vehicles, like those developed at Sandia National Laboratories, for remote cooperative control and sensing in outdoor perimeter detection applications. See Lewis et al., "Cooperative Control of a Squad of Mobile Vehicles," IASTED International Conference on Control and Applications, Honolulu, Hi., Aug. 12–14, 1998. RATLER™ platforms are highly capable but could be cost prohibitive when used in large quantity. Lewis et al. does not disclose a hybrid mobile platform or teach conversion of a mobile platform to an autonomous platform.

Costs can be prohibitive whenever large numbers of robots are needed in search applications. There is a need for a handheld control device that can initiate task execution and coordinate the motion of multiple autonomous robots.

SUMMARY OF THE INVENTION

The present invention provides a handheld control device for controlling one or more mobile robots, comprising a handheld computer and a radio board. The radio board comprises a communication device interfacing with a robot communication device and a microprocessor interfacing with the handheld computer.

The present invention provides a base station controller for interfacing to a handheld computer to control a plurality of mobile robots according to a control input. The handheld computer comprises a user interface for accepting a control input and a port capable of transmitting the control input. The base station controller comprises an interface to the port, a microprocessor capable of communication with the handheld computer, and a communication device capable of communication with each mobile robot.

The present invention teaches a method of controlling one or more mobile robotic vehicles using a handheld control device.

BRIEF DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a handheld control device for controlling one or more mobile robots, comprising a handheld computer and a radio board. The radio board comprises a communication device interfacing with a robot communication device and a microprocessor interfacing with the handheld computer.

The present invention provides a base station controller for interfacing to a handheld computer to control a plurality of mobile robots according to a control input. The handheld computer comprises a user interface for accepting a control input and a port capable of transmitting the control input. The base station controller comprises an interface to the port, a microprocessor capable of communication with the handheld computer, and a communication device capable of communication with each mobile robot.

The present invention teaches a method of controlling one or more mobile robotic vehicles using a handheld control device, comprising a handheld computer and a radio board.

The present invention provides a device and method to modify inexpensive, commercially available handheld computers for use in controlling multiple networked robots.

Hybrid Mobile Robot

Figure 1:
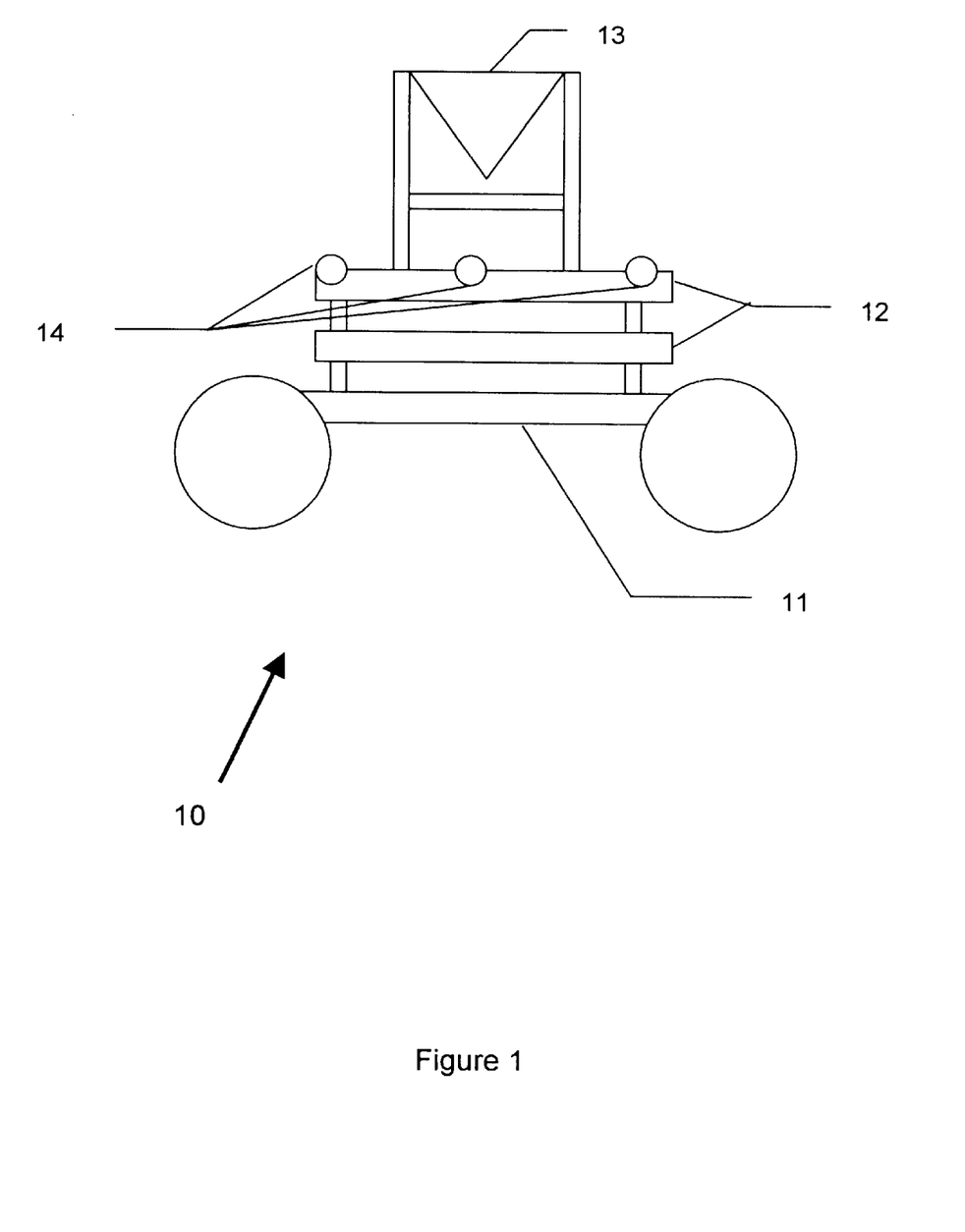
FIG. 1 is a schematic of a robotic vehicle of the present invention, showing an side view of the vehicle.

An example of a robotic vehicle according to the present invention is given in FIG. 1. FIG. 1 shows a side view of a schematic of robotic vehicle 10. Robotic vehicle 10 is built using the framework of remote control vehicle 11, and comprises printed circuit board 12 and triangulation device 13. Mobile robot 10 can further comprise obstacle sensors 14.

In order to simplify construction and to reduce cost, robotic vehicle 10 is built on a commercially available platform, such as remote control vehicle 11. One or more printed circuit boards 12 are mounted with remote control vehicle 11. Printed circuit board 12 is capable of controlling the remote control vehicle as an autonomous robotic vehicle. Triangulation device 13 is connected with printed circuit board 12, and is capable of determining robotic vehicle 10 location with respect to two or more other robotic vehicles 10. One or more obstacle sensors 14, capable of sensing a moving obstacle (for example another robotic vehicle 10) or a fixed obstacle such as a wall, can be mounted with printed circuit board 12.

One embodiment of mobile robot 10 that was built uses remote control (RC) vehicle 11 having two motors, one motor for each of two drive wheels, with two connecting wires used for controlling each wheel. One commercially available remote control vehicle is a "Super Rebound™" RC car manufactured by Tyco. Any similar remote control car having two motors and each motor having a pair of connecting wires for control of each motor could be used. The Tyco printed circuit board was removed from the RC car and replaced with printed circuit boards 12 according to the present invention. Steering was accomplished by separately varying the control for each wheel. An embodiment with only one drive wheel driven by a motor, similar to a motorcycle, could utilize a second motor for steering or have limited turning capability with only one motor.

Triangulation device 13 can comprise an ultrasound device (for example, an omni-directional ultrasound range sensor) and a timer, capable of timing a travel time of the ultrasound pulse.

Robotic Vehicle Communications and Processing

Figure 2:
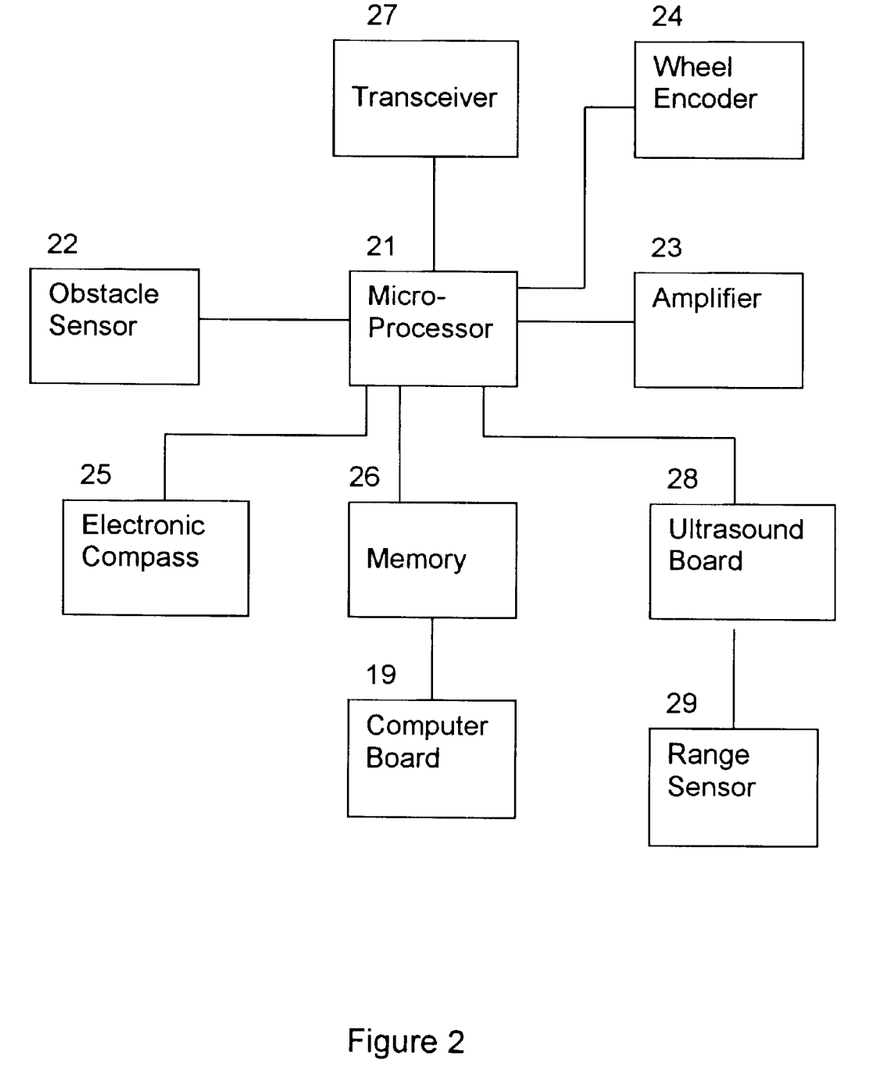
FIG. 2 is an electronics block diagram for robotic vehicle conversion kit components according to the present invention.

FIG. 2 is an electronics block diagram for robotic vehicle conversion kit components according to the present invention. Microprocessor 21 interfaces to obstacle sensor 22, amplifier 23, wheel encoder 24, electronic compass 25, memory 26, transceiver 27, and ultrasound board 28. Ultrasound board 28 interfaces to range sensor 29. Each amplifier 23 interfaces to a drive motor on a remote control car. Microprocessor 21 can interface to optional computer board 19 for faster computing.

Microprocessor 21 needs to be suitable for use with remote control vehicle 11 shown in FIG. 1.

Obstacle sensor 22 interfaces with microprocessor 21 and is used to detect proximity of obstacles for collision avoidance. One obstacle sensor 22 can be used to detect in one direction (for example, toward the front of the vehicle). An embodiment having four obstacle sensors 22 can detect obstacles toward the front, back, left side, and right side of the vehicle. A suitable obstacle sensor 22 used in an implemented embodiment is an infrared light emitting diode and receiver pair, for example those manufactured by Sharp, model GP2D12. Other commercially-available sensors exist, but not as small as the Sharp sensors.

Amplifier 23 interfaces with microprocessor 21, utilizes power routed through power conditioning electronics (not shown), and connects through a connecting wire to drive the drive motor (not shown). The power conditioning electronics take power input from a battery (for example in the range of 7–22 volts) and output 5 volts to meet power needs of the vehicle. Some electronics require 3.3 volts, which must be further regulated from the 5 volt output to achieve the required voltage. Amplifier 23 used in an implemented embodiment is a bi-directional pulse width modulation (PWM) amplifier, requiring 5 volts, with one amplifier 23 driving each drive motor on the remote control vehicle. Bi-directional means that the drive motor can be run both forward and backward. A PWM amplifier circuit, consisting of several MOSFETs, resistors, and transistors, was fabricated and used in the implemented embodiment. Knowledge to fabricate a PWM circuit from commercially available MOSFETs, resistors, and transistors, is known to those skilled in the art.

Wheel encoder 24, mounted with the remote control vehicle 11 shown in FIG. 1, generates a signal to microprocessor 21 indicating the distance the wheel has traveled. A suitable wheel encoder of sufficiently small size is model HEF10, manufactured by MicroMo Electronics. Other companies that carry similar products include Encoder Technology, US Digital Corporation, API Harowe, and Hewlett Packard.

Electronic compass 25, mounted with the printed circuit board, indicates magnetic north and provides electronic output to microprocessor 21. A suitable electronic compass is model Vector 2X, manufactured by Precision Navigation, Inc. Other companies also carry similar compasses capable of providing electronic output to a microprocessor.

Memory 26, mounted with the printed circuit board, can be a dual-port random access memory (RAM) accessible by microprocessor 21. If the conversion kit further comprises an optional faster computer board 19, memory 26 also can be accessed by computer board 19 to share data between microprocessor 21 and computer board 19.

One example of microprocessor 21 is an 8-bit reduced instruction set (RISC) microprocessor—for example, an Atmel Mega AVR 8-bit RISC microprocessor, which has 4 Kbytes or random access memory and 128 Kbytes of FLASH memory for program storage. The Atmel processor is in-circuit programmable and can be reprogrammed to execute different control software. Other commercially available microprocessors with sufficient memory and able to be reprogrammed can also be used.

As an example, microprocessor 21 and computer board 19 can process commands to disburse one or more robotic vehicles 10 throughout an area with obstacle sensors 22 used to follow a wall, and can work with transceiver 27 in a link-and-repeat command mode to send commands to the other robotic vehicles 10 outside communication range.

In another application with advanced control, communication and control electronics of the present invention can be capable of executing source search methods using decentralized control (for example, no master robot, no master computer). See Hurtado et al., "Distributed Sensing and Cooperative Control for Swarms of Robotic Vehicles," Proceedings of IASTED International Conference on Control and Applications, Honolulu, Hi., Aug. 12–14, 1998, pp. 175–178, incorporated herein by reference.

An example for computer board 19 from FIG. 2 is the 32-bit 386EX board PC-Minus by R. L. C. Enterprises, Inc. which is roughly 100 times faster than microprocessor 21 and can be used for more compute-intensive calculations (for example, those used in a multi-vehicle cooperative search algorithm).

Transceiver 27 interfaces bi-directionally with microprocessor 21 and can be used to broadcast commmunications to other robotic vehicles and to a base station. Communication over a transceiver network does require compatible radio transceivers but does not require global coordination. In the implemented embodiment, identical radios are used on multiple robotic vehicles 10 (shown in FIG. 1) and on a base station control device and are based on the TR1000 radio transceiver integrated circuit manufactured by RF Monolithics. These radios are configured for a bit rate of 125 Kbps, with an effective bit rate rate of 50 Kbps after the data has been encoded. All radios share the same 916.5 MHz frequency. The radios also are configured for ASK (Amplitude Shift Keying) modulation. The network protocols are implemented in software on the radios. The implemented network is based on a TDMA (Time Division Multiple Access) scheme that expands the number of time slots depending on the number of vehicles and basestations in the network.

Ultrasound board 28 interfaces to microprocessor 21 and is part of triangulation device 13 shown in FIG. 1. Microprocessor 21 functions as a timer for range sensor 29 (for example an omni-directional ultrasound range sensor, capable of sending and receiving an ultrasound pulse) and is capable of timing the travel time of the pulse. Microprocessor 21 sends a message to transceiver 27 to broadcast to the other robots, indicating that an ultrasound pulse is about to be sent. When this message is received by the other robot transceivers 27 and microprocessors 21, these microprocessors 21 start their timers. Microprocessor 21 then signals ultrasound board 28 to send a pulse. On the receiving robotic vehicles 10, ultrasound board 28 interrupts microprocessor 21 indicating that the pulse has been received. Microprocessor 21 then calculates the distance (for example, using a travel time of 1 foot per millisecond). After the distance is calculated, the distance is transmitted to all other robotic vehicles 10. Triangulation can be used to locate a robotic vehicle 10 relative to two other robotic vehicles 10.

Note that whenever three or more robotic vehicles geolocate with respect to each other, the location determined is not absolute. The location determined is relative to the other robotic vehicles. For example, a robotic vehicle can work with the two nearest robotic vehicles, then using one location as the origin and using another location for the x-axis, the third location can be placed relative to the others. A range (for example, the maximum untrasound range or maximum communication range) can then be used to find position and determine deployment distance between robotic vehicles. Note that the maximum ultrasound range in the implemented embodiment is less than the maximum communication range. A communication repeater mode can be used to communicate with robotic vehicles outside communication range by implementing a linked chain of repeated commands.

A suitable ultrasound board is the Polaroid 6500 ranging module, and a suitable ultrasound transducer is the Polariod Series 7000. When configured in an omni-direction configuration, the maximum range is approximately 30 feet.

Base Station Communication and Processing

Figure 3:
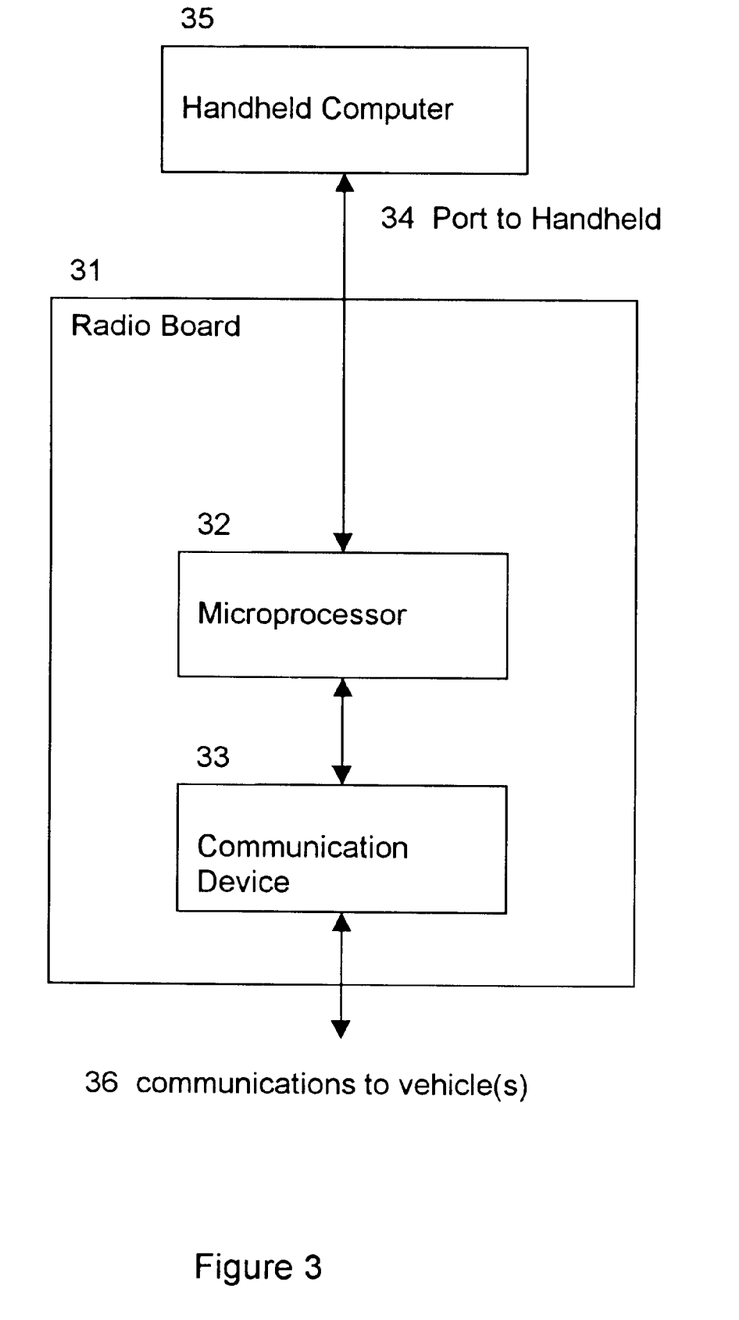
FIG. 3 is an electronics block diagram for a handheld control device according to the present invention.

FIG. 3 is an electronics block diagram for a handheld control device according to the present invention. The handheld control device comprises handheld computer 35 and a base station controller, which is shown as radio board 31. Radio board 31 comprises microprocessor 32 and communication device 33. Radio board 31 interfaces to handheld computer 35 through port 34. Communication device 33 communicates to one or more robotic vehicles 10 through communications 36.

Radio board 31 can be a printed circuit board packaged in a portable structure, preferably for handheld use. Communication device 33 can be a transceiver and must be compatible with and share the same frequency as robotic vehicle transceiver 27, discussed above. In the implemented embodiment, the same radio transceiver was used for robotic vehicle transceiver 27 and base station controller communication device 33. Communication device 33 broadcasts messages out where all robotic vehicles in range receive the same message packet. Each packet format begins with the number of bytes, the destination (for example, to all robotic vehicles or to a specific robotic vehicle), and the message (for example, a command to return a status or to perform an action). Each robotic vehicle discards any message not intended for him. Communication device 33 receives vehicle status and vehicle location broadcast from a robotic vehicle within communication range of communication device 33. In the implemented embodiment, the vehicle location can be broadcast up to a 100 foot radius from the vehicle.

One command mode is a link-and-repeat command mode. Each robotic vehicle in the plurality of vehicles is assigned an identifier. A subset of vehicles can be selected by number and told to link with each other. Each vehicle broadcasts a message to determine which other vehicles are within broadcast range. The process is repeated until all broadcast ranges are determined. Then a linked list can be created to indicate linked paths to reach all vehicles outside broadcast range. For example, if vehicle 2 is within broadcast range of vehicle 1 but vehicle 3 is not, and if vehicle 3 and vehicle 1 are within broadcast range of vehicle 2, then vehicle 1 can send messages to vehicle 3 by going through vehicle 2 as a link. This command mode can allow multiple robotic vehicles to deploy throughout an area where each vehicle deploys within broadcast range of its immediate neighbor vehicles. A command can then be sent from the first vehicle in the linked chain to the last vehicle by each vehicle repeating the message it receives from its predecessor vehicle.

Similarly, microprocessor 32 in the implemented embodiment is the same as microprocessor 21.

Handheld computer 35 is capable is accepting operator commands (for example, through selectable on-screen menus) and capable of displaying output (for example, a robotic vehicle status, or a table showing a linked-list communication chain). Handheld computer 35 can be any device such as a computer workstation, a computer laptop, or an electronic personal organizer (for example, a Palm VX™ Pilot handheld computer, manufactured by Palm), capable of interfacing with microprocessor 32 and capable of accepting input and displaying output.

Example Embodiment of a Networked Robotic Vehicle System

An example embodiment of the present invention of a networked robot system controlled by a handheld control device has been used in research on cooperative control of mobile robotic vehicles.

An example application of the networked robotic vehicle system is to start all the robotic vehicles at one end of a building, then let them deploy throughout the building with spacing between vehicles at less than or equal to the maximum communication range. Using a link-and-repeat command mode, all commands can be repeated throughout the robotic vehicle chain to communicate from one end of the building to the other end.

A prototype networked robotic vehicle was built on top of a commercially available Super Rebound™ remote control car, manufactured and commercially available from Tyco. The embodiment built replaces the Tyco printed circuit board from the RC car with two printed circuit boards designed according to the present invention. The first circuit board contains power conditioning electronics and two full bridge PWM amplifiers for controlling the motors. Each of the two amplifiers is used to control one of the two motors on the remote control car. It also includes a switching voltage regulator with a 5 volt output. The second printed circuit board contains an Atmel Mega processor (described previously for microprocessor 21) and interface electronics to a 915 MHz radio transceiver with antenna (described previously for transceiver 27), electronic compass, four infrared proximity sensors used for obstacle detection, and an omni-directional ultrasound range sensor. In addition, this board contains a dual port memory interface to a commercially available 66 MHz 386EX computer board. A wheel encoder is added to the commercially available remote control vehicle.

A prototype embodiment of a handheld control device shown in FIG. 3 used a Palm Powered™ handheld computer (model Palm Vx™ Pilot, manufactured by Palm) as handheld computer 35 to interface to a user and accept commands. Radio board 31 was designed and assembled from commercially available components to interface to handheld computer 35 through port 34 which is a serial port on the handheld computer used. For communication device 33, the implemented embodiment uses the same model TR1000 transceiver as transceiver 27 described in FIG. 2.

The implemented embodiment incorporates components discussed in FIGS. 2 and 3, plus components to supply power to the system (not shown in the figures). Motor and power supply components include: a battery sufficient to supply 7–22 volts of power, a power conditioner able to take the 7–22 volts as input and to output 5 volts (required to power many of the components), and a linear regulator able to take the 5 volts as input and to output 3.3 volts (required to power other components used in the implementation, such as the radio transceiver, which accepts a maximum supply voltage of 4.0 volts). In the implemented embodiment, the motor/power supply components and interface are included on the first motor drive circuit board.

Method of Using a Base Station to Control Multiple Robotic Vehicles

Figure 4:
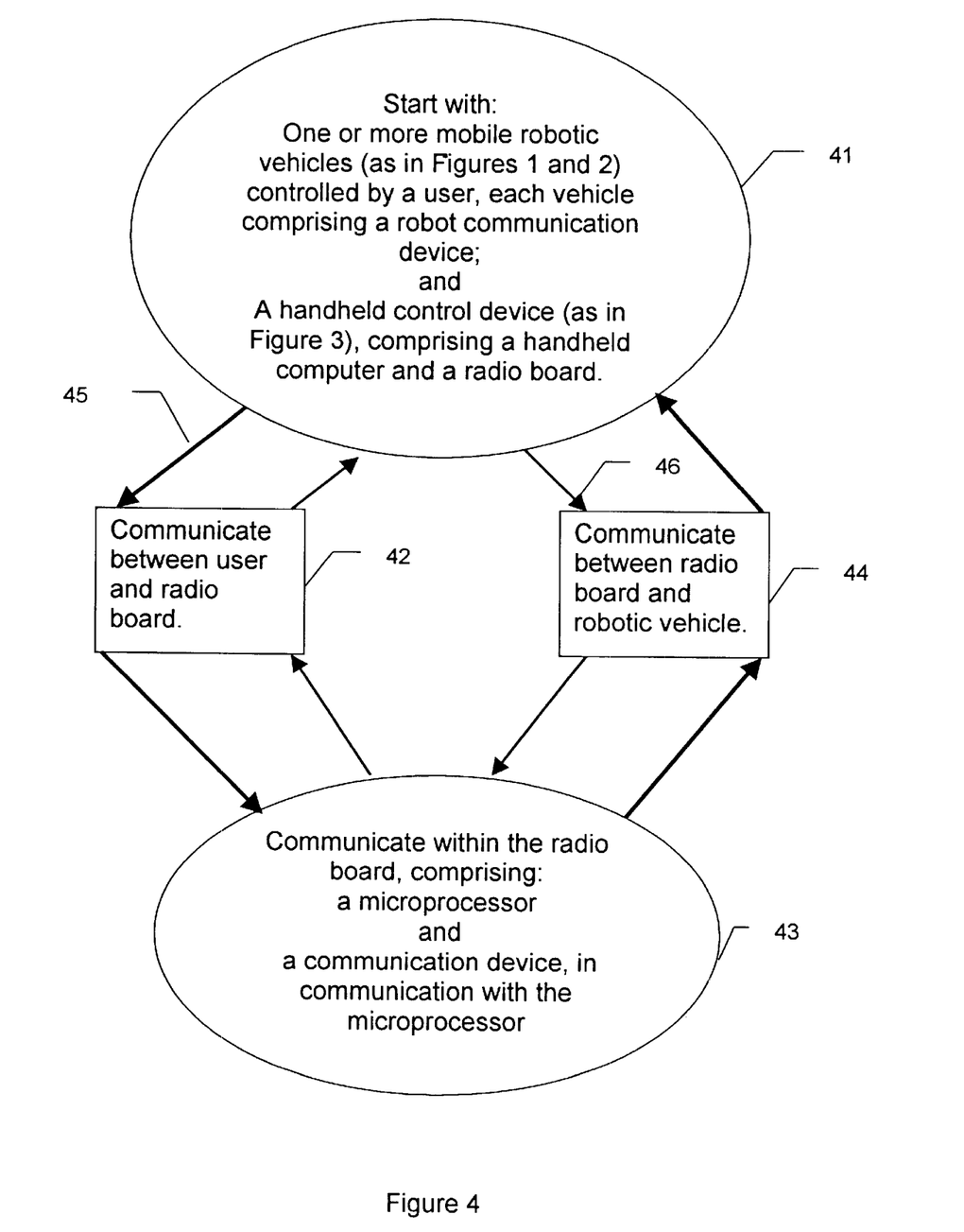
FIG. 4 is a flow diagram of the method of using a handheld device to control one or more mobile robotic vehicles according to the present invention.

FIG. 4 is a flow diagram of the method of using a handheld device to control one or more mobile robotic vehicles with networked communications according to the present invention.

In step 41, start with one or more mobile robotic vehicles, each with a robot communication device (as in FIGS. 1 and 2), controlled by a user, and a handheld control device (as in FIG. 3), comprising a handheld computer and a radio board.

Communicate between the user and the radio board, step 42. In the implemented embodiment, the handheld computer used is a personal data organizer with a serial port, which is connected through a short cable to the radio board, shown in FIG. 3.

The radio board comprises a microprocessor and a communication device, in communication with the microprocessor. Communications occur within the radio board between the microprocessor and the communication device, step 43. On the handheld control device, and as part of the radio board, the microprocessor controls the communication device (for example, a radio transceiver) and holds (or buffers) the data until the handheld computer is ready to receive the data. The handheld computer translates the messages according to the message packet format discussed in relation to FIG. 3. On the other hand, on the robotic vehicle, the vehicle's microprocessor controls the communication device (for example, the radio transceiver), and the microprocessor translates the messages.

Communicate between the radio board and the robotic vehicle, step 44.

Communications can be bidirectional between the handheld control device and one or more mobile robotic vehicles. Communications are shown in FIG. 4 through outer loop 45, showing communications from the user to the robotic vehicle(s) and through inner loop 46, showing communications from the robotic vehicle to the user.

For example, using outer loop 45 to send a user message (for example, a user command) from the handheld control device to one or more robotic vehicles, step 42 comprises the following steps:

Accept the user message from the user using the input-output system of the handheld computer, step 42(*a*). For example, a personal data organizer can accept input using symbols on a touchscreen.

Translate between the user message and a formatted message, according to a message communication format, using the processor on the handheld computer, step 42(*b*). The handheld computer works with character string data and creates a formatted message characterized by: number of bytes, destination, sender, and message.

Determine a communication chain between the handheld control device and the robotic vehicle to be controlled, step 42(*c*), using the processor. For example, the handheld control device can query the robotic vehicle(s) to be controlled to see if it is in communication range. Software running on the handheld computer's processor determines a linked communication chain to be able to transmit and receive messages from any vehicle outside communication range. In order to construct the communication chain, the handheld control device's communication device queries all robotic vehicles and receives responses back from all the vehicles. Any vehicle outside the range is queried in a chain fashion by other robot communication devices, until a linked chain has been built showing communication links to all robotic vehicles' communication devices. Note that this querying process to build the communication chain requires that all robotic vehicles and the handheld control device have bidirectional transceivers as their communication devices.

The radio board comprises a microprocessor and a communication device (for example, a transceiver). Transmit the formatted message to the radio board from the handheld computer, step 42(*d*), using the processor and the microprocessor. The data string is transmitted through the serial port to the microprocessor, which reads the string. The string data is broken down into bit data and sent one bit at a time as RX data (for example, a bit string) to the radio communication device. In the implemented embodiment, a cyclic redundancy check also is performed.

Continuing with the example to send a control input from the user to one or more robotic vehicles, step 44 comprises the following steps:

Transmit the formatted message from the radio board using the radio board's communication device, step 44(*a*).

Receive the formatted message using the robotic vehicle's communication device (for example, its transceiver), step 44(*b*), and use the formatted message to control the robotic vehicle, step 44(*c*).

Using inner loop 46 in FIG. 4 in a communication from a robotic vehicle to a user with a handheld computer (for example, capable of receiving sensed input(s) or a status message from a robotic vehicle), step 44 comprises the following steps:

Accept a sensed input or a status input from the robotic vehicle, step 44(*a'*). For example, the sensed input may be from a sensor on the robotic vehicle for locating a source objective.

Translate the input into a formatted message, step 44(*b'*), using the robotic vehicle microprocessor. Use a format understandable by the controller's microprocessor and transceiver. (Note that in the implemented embodiment, the vehicle's microprocessor performs more computations—for example, it also performs data format translations—than the radio board's microprocessor.)

Transmit the formatted message from the robotic vehicle using the robot communication device, step 44(*c'*).

Receive the formatted message using the radio board's communication device, step 44(*d'*).

Data from the robot is collected by the radio board one bit at a time, and the radio board's microprocessor collects these data bits and generates a character string to send to the handheld computer.

Continuing with the example to send an input from the robotic vehicle to the user's handheld computer for display, step 42 comprises the following steps:

Transmit the formatted message from the radio board, using the radio board's microprocessor, step 42(*a'*). In the implemented embodiment, the microprocessor has an RS-232 serial port to interface with the handheld computer's serial port.

The handheld computer receives the formatted message, using the handheld computer's processor, step 42(*b'*).

Translate between the formatted message and a user message, step 42(*c'*), according to a message communication format. In this step, the processor on the handheld computer translates the machine formatted information to a message format understood by human users.

Display the user-understandable message on the input-output system executing on the handheld computer's processor, step 42(*d'*).

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A handheld control device for controlling one or more robots, each mobile robot comprising a robot communication device, the handheld control device comprising:
   a) a handheld computer for controlling said one or more robots,
   b) a radio board, in communication with the handheld computer, comprising:
      i) a radio board communication device, mounted with the radio board, capable of communication with the robot communication device; and
      ii) a radio board microprocessor, mounted with the radio board, interfacing with the handheld computer, and interfacing with the radio board communication device; and
      iii) wherein the radio board microprocessor receives the control input through the interface.

2. The handheld control device of claim 1, wherein the robot communication device comprises a robot receiver, wherein the radio board communication device comprises a radio transmitter, wherein the robot receiver is responsive to the radio transmitter.

3. The handheld control device of claim 1, wherein the robot communication device comprises a robot transmitter, wherein the radio board communication device comprises a radio receiver responsive to the robot transmitter.

4. The handheld control device of claim 1, wherein the robot communication device comprises a robot transceiver, wherein the radio board communication device comprises a radio transceiver capable of communication bi-directionally with the robot transceiver.

5. The handheld control device of claim 1, wherein the handheld computer comprises:
   a) an input-output system, mounted with the handheld computer, receiving an input from an operator, and displaying an output to the operator;
   b) a processor, mounted with the handheld computer, interfacing with the input-output system; and
   c) a memory, mounted with the handheld computer, interfacing with the processor.

6. The handheld control device of claim 1, wherein the handheld computer comprises an electronic personal organizer.

7. A handheld control device for controlling a plurality of mobile robots, according to a control input, each mobile robot comprising a robot communication device, the handheld control device comprising:
   a) a handheld computer, having a communication port;
   b) a radio board, in communication with the handheld computer, comprising:
      i) a radio board communication device, mounted with the radio board, capable of communication with the robot communication device for each mobile robot; and
      ii) a radio board microprocessor, mounted with the radio board, interfacing with the handheld computer, and interfacing with the radio board communication device;
      iii) an interface to the communication port;
      iv) wherein the radio board microprocessor receives the control input through the interface.

8. The handheld control device of claim 7, wherein each robot communication device comprises a robot receiver, wherein the radio board communication device comprises a radio transmitter, wherein each robot receiver is responsive to the radio transmitter.

9. The handheld control device of claim 7, wherein each robot communication device comprises a robot transmitter, wherein the radio board communication device comprises a radio receiver responsive to each robot transmitter.

10. The handheld control device of claim 7, wherein each robot communication device comprises a robot transceiver, wherein the radio board communication device comprises a radio transceiver capable of communication bi-directionally with each robot transceiver.

11. The handheld control device of claim 7, wherein the handheld computer comprises:
   a) an input-output system, mounted with the handheld computer, receiving an input, and displaying an output;
   b) a processor, mounted with the handheld computer, interfacing with the input-output system; and
   c) a memory, mounted with the handheld computer, interfacing with the processor.

12. The handheld control device of claim 7, wherein the handheld computer comprises an electronic personal organizer.

13. A handheld control device for controlling a plurality of mobile robots by an operator, according to a control input, each mobile robot comprising a robot transceiver, the handheld control device comprising:
   a) a communication cable;
   b) a handheld computer, comprising:
      i) an input-output system, receiving an input from the operator, and displaying an output to the operator;
      ii) a processor, interfacing with the input-output system;
      iii) a memory, interfacing with the processor;
      iv) a communication port, mounted with the handheld computer, accepting a connection from the communication cable;
   c) a radio board, in communication with the handheld computer, comprising:
      i) a radio transceiver, mounted with the radio board, capable of communication bi-directionally with each robot transceiver; and
      ii) a radio board microprocessor, mounted with the radio board, interfacing with the handheld computer through the communication cable, and interfacing with the radio transceiver.

14. The handheld control device of claim 13, wherein the handheld computer comprises an electronic personal organizer.

15. A base station controller for interfacing to a handheld computer to control a plurality of mobile robots according to a control input, wherein the handheld computer comprises a user interface capable of accepting the control input and a communication port capable of transmitting the control input, wherein each mobile robot comprises a robot communication device, the base station controller comprising:
   a) an interface to the communication port, capable of accepting the control input;
   b) a microprocessor, mounted with the base station controller, capable of communication with the handheld computer using the communication port interface; and
   c) a communication device, mounted with the base station controller, capable of communication with the robot communication device for each mobile robot, and interfacing with the microprocessor;
   d) wherein each mobile robot is capable of receiving the control input from the user interface.

16. The base station controller of claim 15, wherein the handheld computer comprises an electronic personal organizer.

17. A method for a user to control at least one mobile robotic vehicle using a handheld control device, each robotic vehicle comprising a robot communication device, wherein the handheld control device comprises a handheld computer and a radio board, in communication with the handheld computer, wherein the handheld computer comprises an input-output system and a processor, wherein the radio board comprises a microprocessor and a radio board communication device, in communication with the microprocessor, the method for each robotic vehicle comprising:
   a) communicating between the user and the radio board using the handheld computer and the microprocessor; and
   b) communicating between the radio board and the robotic vehicle using the radio board communication device and the robot communication device.

18. The method of claim 17, wherein communicating between the user and the radio board comprises:

a) accepting a user message from the user using the input-output system;

b) translating between the user message and a formatted message, according to a message communication format, using the processor;

c) determining a communication chain between the handheld control device and the robotic vehicle, using the processor; and d) transmitting the formatted message from the handheld computer to the radio board, using the processor and the microprocessor.

19. The method of claim 18, wherein communicating between the radio board and the robotic vehicle comprises:

a) transmitting the formatted message from the radio board using the radio board communication device;

b) receiving the formatted message using the robot communication device; and c) using the formatted message to control the robotic vehicle.

20. The method of claim 17, wherein the robotic vehicle further comprises a vehicle microprocessor, wherein communicating between the radio board and the robotic vehicle comprises:

a) accepting an input from the robotic vehicle;

b) translating the input into a formatted message, using the vehicle microprocessor;

c) transmitting the formatted message from the robotic vehicle using the robot communication device; and d) receiving the formatted message using the radio board communication device.

21. The method of claim 20, wherein communicating between the user and the radio board comprises:

a) transmitting the formatted message from the radio board, using the microprocessor;

b) receiving the formatted message by the handheld computer, using the processor;

c) translating between the formatted message and a user message, according to a message communication format, using the processor; and d) displaying the user message on the input-output system, using the processor.

22. The handheld control device of claim 17, wherein the handheld computer comprises an electronic personal organizer.

* * * * *